Dec. 16, 1930.  P. P. ADAMS  1,785,172
FRONT WHEEL GUIDE AND BRAKE
Filed May 5, 1928   2 Sheets-Sheet 1
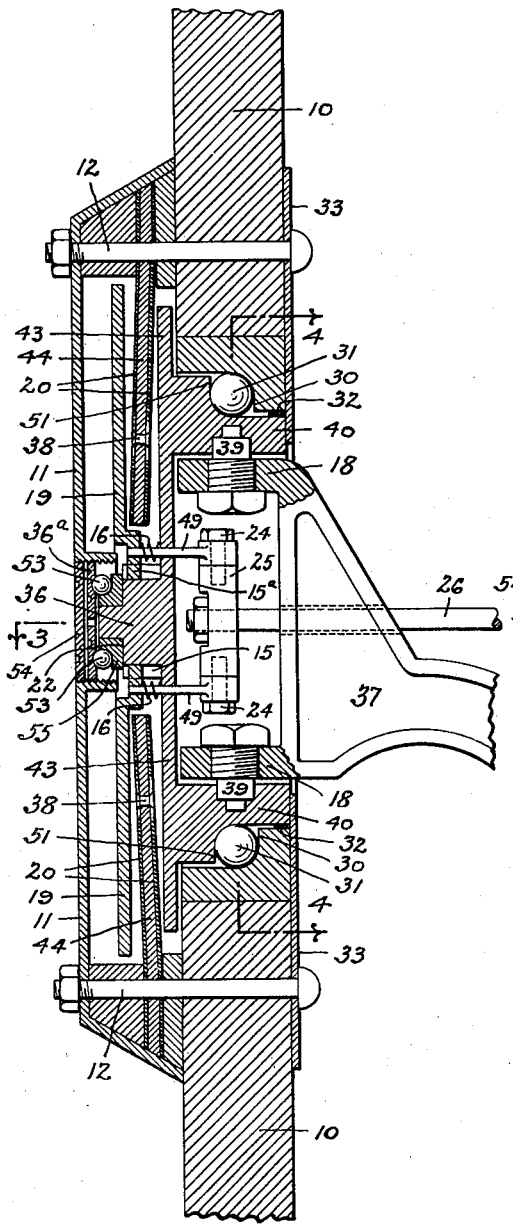
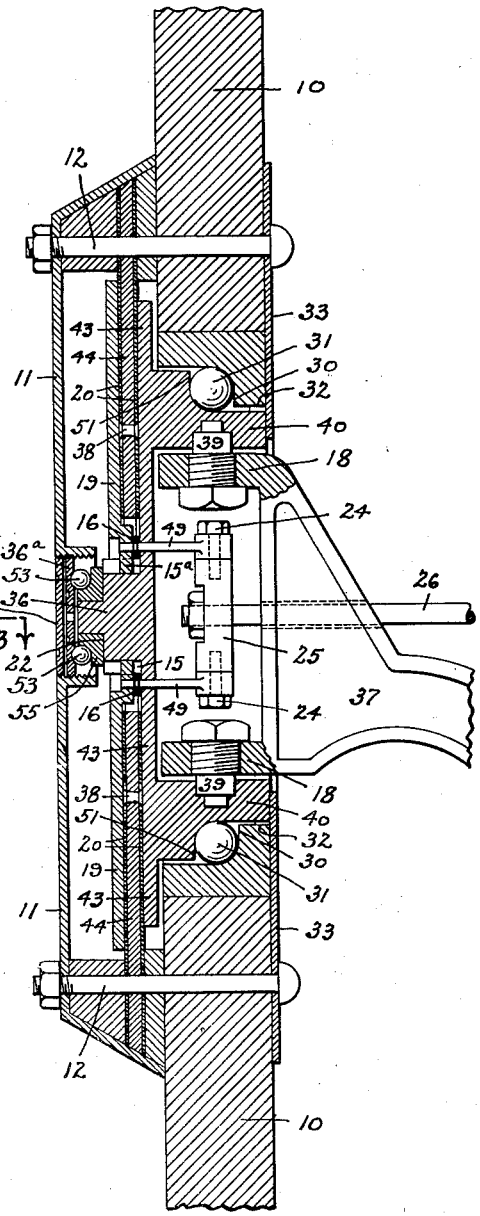
PETER PAUL ADAMS INVENTOR

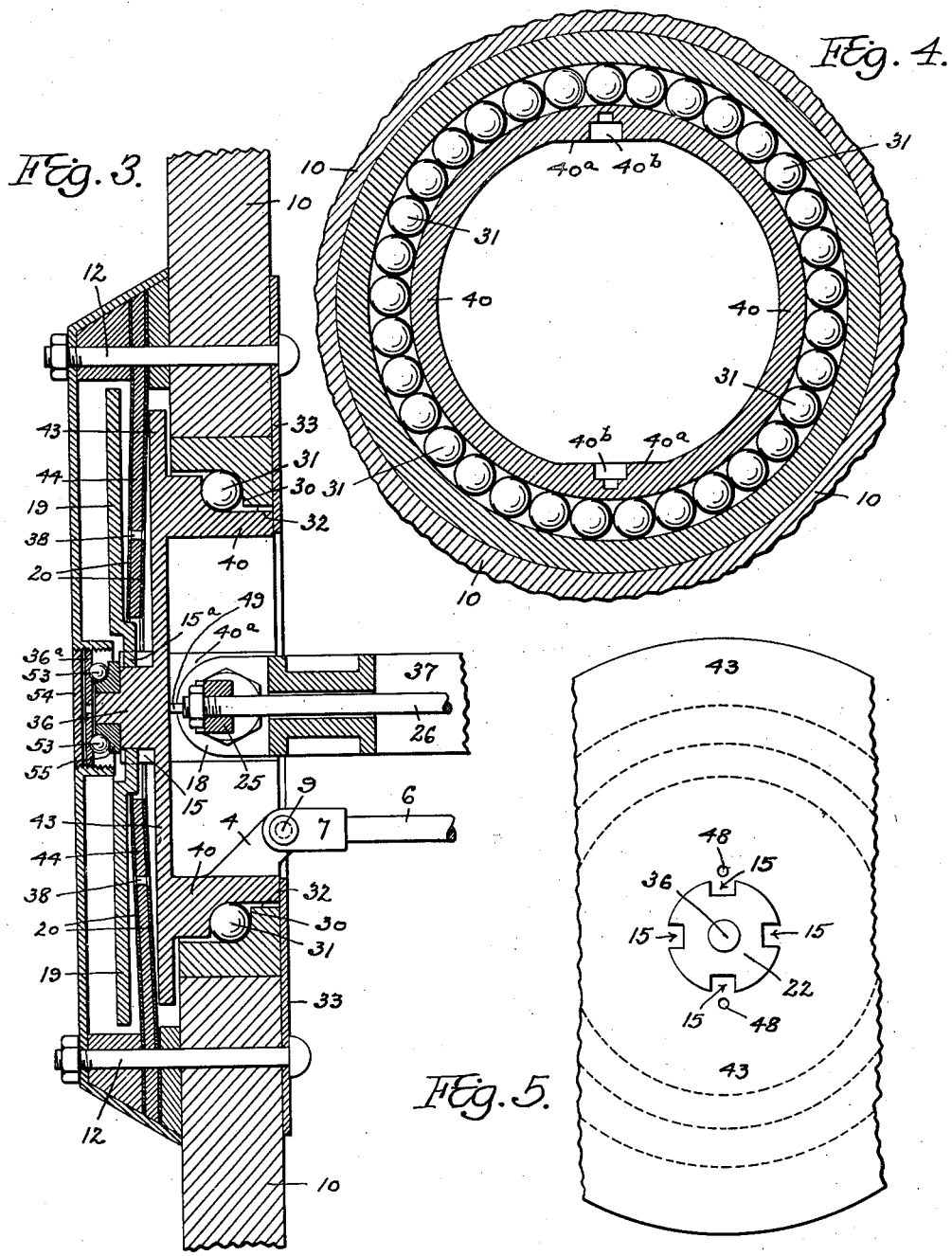

Patented Dec. 16, 1930

1,785,172

UNITED STATES PATENT OFFICE

PETER PAUL ADAMS, OF TURKEY RIVER, IOWA

FRONT-WHEEL GUIDE AND BRAKE

Application filed May 5, 1928. Serial No. 275,459.

This invention relates to vehicle brakes especially designed for use upon the front wheels of vehicles, an object being to provide a brake which will be effective irrespective of the position of the wheel, that is, whether the vehicle is traveling straight ahead or making a turn.

Another object of the invention is the provision of a brake wherein the braking action will be gradual, the construction and operation of the brake being such that a gradual contact or engagement between the braking surfaces will occur when the brakes are applied.

The invention further includes other novel features specifically referred to and pointed out in the appended claims.

In the drawings:—

Figure 1 is a vertical sectional view showing a fragmentary portion of a vehicle wheel and axle with the invention applied, the brake being shown in released position.

Figure 2 is a like view showing the brake applied.

Figure 3 is a horizontal sectional view taken substantially on the line 3—3 of Figure 1.

Figure 4 is a fragmentary section on the line 4—4 of Figure 1.

Figure 5 is a detail elevation looking at the inside of the pivotally mounted brake disk.

Referring to the drawings in detail wherein like characters of reference denote corresponding parts, the reference character 37 indicates a portion of the front axle of a motor vehicle from which extends spaced upper and lower arms 18. Threadedly positioned within these arms are oppositely extending trunnions 39 which provide pivotal connection with a brake disk 43. The disk 43 has extending therefrom an annular flange 40 and this flange is provided upon its inner periphery with opposed flat portions 40a having sockets 40b therein to receive the trunnions 39. The disk 43 is thus mounted for horizontal pivotal movement upon the end of the axle 37.

Also extending from the flange 40 of the disk 43 is an apertured lug 4 and pivotally connected to this lug through the medium of a pivot bolt 9 is a clevis 7. A rod 6 is connected with this clevis so that the disk 43 may be swung pivotally through the medium of the usual steering mechanism for the purpose of controlling the direction of travel of the vehicle to which the invention is applied.

The outer periphery of the flange 40 is provided with an annular shoulder 51 and this shoulder cooperates with a shoulder 30 provided within the wheel 10 to form a raceway for the reception of anti-friction balls 31.

Extending outwardly from the face of the disk 43 is a concentrically located spindle 36. This spindle is provided with a shoulder 22 and mounted upon this shoulder is a cone 55 which forms a part of an anti-friction bearing. This cone receives balls 53 which operate in a raceway provided by this cone and by a disk 36 which is threadedly engaged within an opening provided in a cap 11 carried by the wheel 10. This cap 11 is held in place by means of bolts 12 which pass through the cap and through the wheel. The disk 36 is provided with an opening for the introduction of lubricant so as to properly lubricate both the anti-friction device 35 and the anti-friction device 31, as will be later explained. A cap 54 is threadedly positioned to provide a cover for the disk 36 and the opening therein so as to exclude dust and dirt and prevent the escape of lubricant.

Secured to the wheel 10 preferably by means of the bolts 12 is a brake disk 44. This disk is covered with a suitable lining 20 which is held in place by sunken rivets 38. The disk 44 and consequently the lining 20 are dished as shown so that the central portion of the disk is spaced further from the brake disk 43 than the outer portion.

Positioned upon the outside of the disk 44 and arranged parallel with the face of the disk 43 is a disk 19. This disk is provided with a central offset portion having an opening therein and notches 15 which are spaced around the opening. These notches receive ribs 15a which extend radially around the spindle 21, so that the disk 19 may move axially but will be held against rotation.

Extending through the openings 48 provided in the disk 43 are links 49. The outer ends of these links are secured to opposite ends of a connecting bar 25 through the medium of bolts 24. One end of a brake rod 26 is secured to the rod 25 and when this brake rod is pulled outward by suitable operating mechanism (for example a foot pedal) the disk 19 will be drawn inward against the lining of the disk 44 and will force this lining against the disk 43 as will be readily understood. Springs 16 may be mounted upon the links 40 to normally hold the disks in separated relation and to insure proper separation of the disks when pull upon the brake rod is relieved.

Due to the dished shape of the disk 44, when the brake is applied, the central portion of the disk 19 will first engage the central portion of the disk 44. Continued inward movement of the disk 19 will cause the disk 44 to engage the outer portion of the disk 43, so that the braking action will be slight when the brake is first applied. Continued application of the brakes will gradually increase the contacting surfaces between the disks 43, 44 and 19 until a complete application of the brake is effected. The braking action will thus be gradual and no grabbing effect will be possible irrespective of the force of application.

As previously stated, lubricant may be forced in through the opening of the disk 36 until the entire braking mechanism including the brake disks and bearings 31 are lubricated. A felt or equivalent washer 32 is positioned between the flange 40 and the adjacent surface of the wheel 10 and an annular retaining ring 33 which is held in place by the bolts 12, acts to hold the washer in place.

The invention is susceptible of various changes in its form, proportions and minor details of construction and the right is herein reserved to make such changes as properly fall within the scope of the appended claims.

Having described the invention what is claimed is:—

1. In a vehicle wheel brake, a pivotally mounted axle carried non-rotatable brake disk, a second non-rotatable brake disk spaced therefrom, means to mount the second disk for movement toward and away from the first mentioned disk, means to move said second mentioned disk, and a dished, wheel carried, brake disk positioned between and normally spaced from the first and second mentioned disks and engageable with the latter when the second mentioned disk is moved in one direction.

2. In a vehicle wheel brake, a pivotally mounted, axle carried, non-rotatable brake disk, a second non-rotatable brake disk spaced therefrom, means to mount the second disk for movement toward and away from the first mentioned disk, means to move said second mentioned disk, and wheel carried means acted upon when the second mounted disk is moved in one direction to provide a gradual contacting engagement between the disk and wheel carried means.

3. In a vehicle wheel brake, an axle carried non-rotatable brake disk, an annular flange extending from one face of the disk, means providing a pivotal connection between the axle and flange, a wheel rotatably mounted upon the flange and having a recess in its outer face, a cap to close said recess and provide a housing, a spindle extending from the disk into the housing, a second disk movable toward and away from the first mentioned disk within the housing and spaced from said first mentioned disk, means to hold the second disk against rotation, and a brake disk carried by the wheel and extending into the housing between the first and second mentioned disks and normally spaced therefrom, and means to move said second mentioned disk to provide braking engagement between all of the disks.

In testimony whereof I affix my signature.

PETER PAUL ADAMS.